(12) United States Patent
Lee et al.

(10) Patent No.: US 8,629,835 B2
(45) Date of Patent: Jan. 14, 2014

(54) INPUT DEVICE

(75) Inventors: Hyun Jeong Lee, Seoul (KR); Wook Chang, Seoul (KR); Seung Ju Han, Seoul (KR); Joon Ah Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 868 days.

(21) Appl. No.: 12/453,351

(22) Filed: May 7, 2009

(65) Prior Publication Data

US 2010/0127979 A1    May 27, 2010

(30) Foreign Application Priority Data

Nov. 21, 2008 (KR) .................. 10-2008-0116079

(51) Int. Cl.
*G06F 3/033* (2013.01)
*G09G 5/08* (2006.01)

(52) U.S. Cl.
USPC ........................................................ 345/158

(58) Field of Classification Search
USPC .................................................. 345/156–173
See application file for complete search history.

(56) References Cited

U.S. PATENT DOCUMENTS

| 5,805,137 A * | 9/1998 | Yasutake ...................... 345/156 |
| 2008/0211766 A1* | 9/2008 | Westerman et al. .......... 345/156 |

FOREIGN PATENT DOCUMENTS

| JP | P3686686 | 6/2005 |
| KR | 10-2006-0019701 | 3/2006 |
| KR | 10-2008-0032901 | 4/2008 |

* cited by examiner

*Primary Examiner* — Kevin M Nguyen
(74) *Attorney, Agent, or Firm* — Staas & Halsey LLP

(57) ABSTRACT

Provided is an input device that may sense a touch and a motion, generate a sensing signal with respect to the sensed touch and motion, generate an input signal based on the sensing signal, and transmit the input signal to a display device. The display device may control an object displayed on the display device based on the input signal.

22 Claims, 12 Drawing Sheets

FIG. 3
310
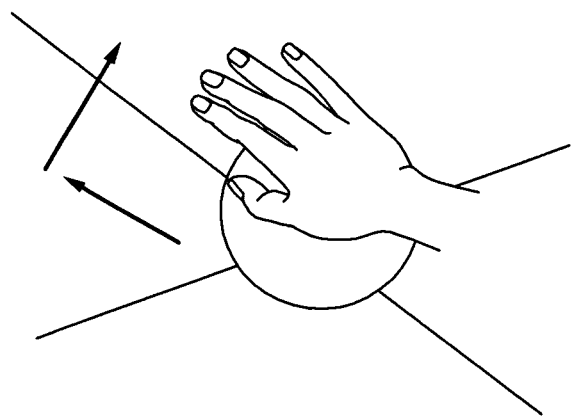
320
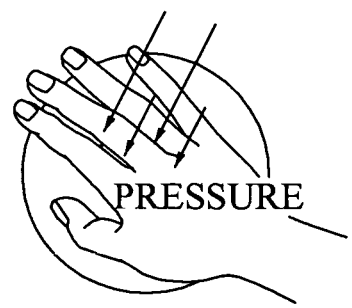
MOVEMENT OF HAND
PRESSURE

FIG. 6
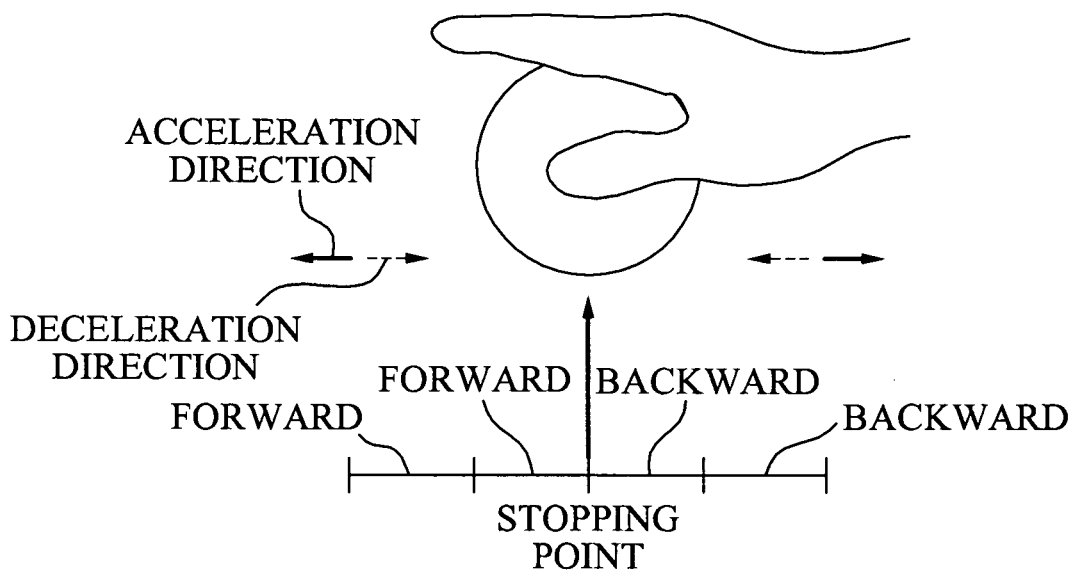
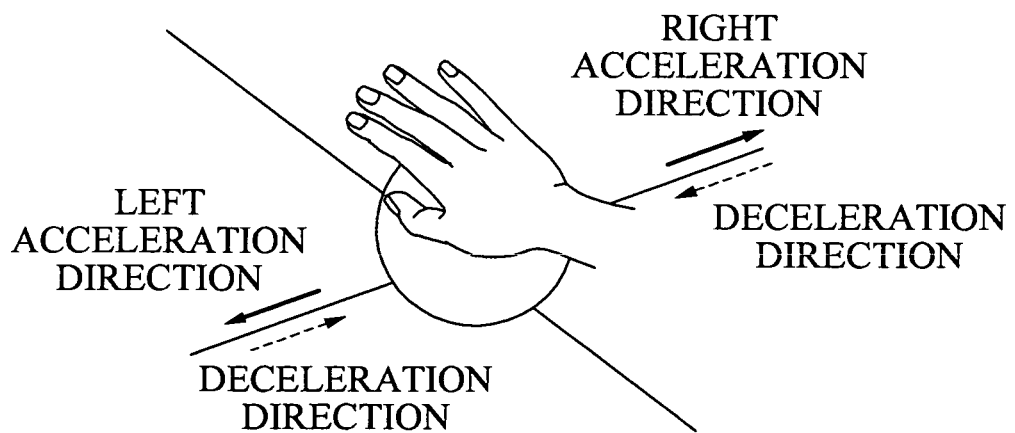

FIG. 8
810
MOVEMENT OF HAND
820
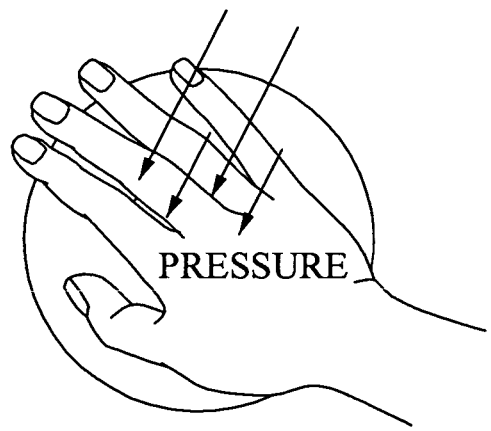
MOVEMENT OF HAND
PRESSURE

FIG. 10
1010
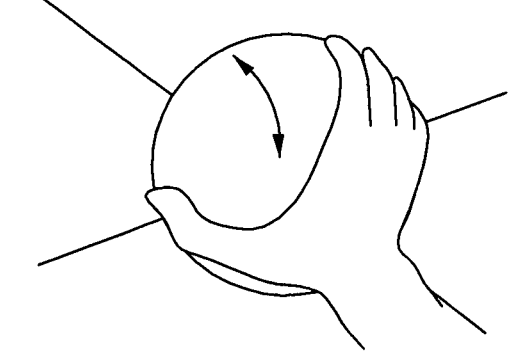
1020
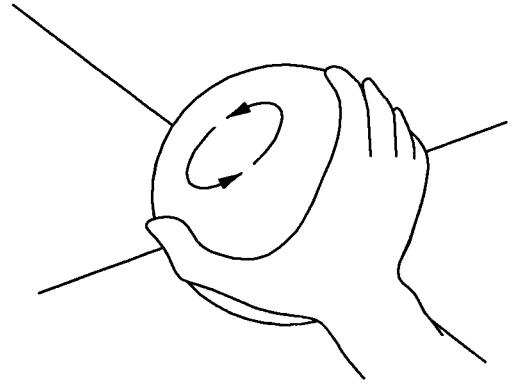
1030
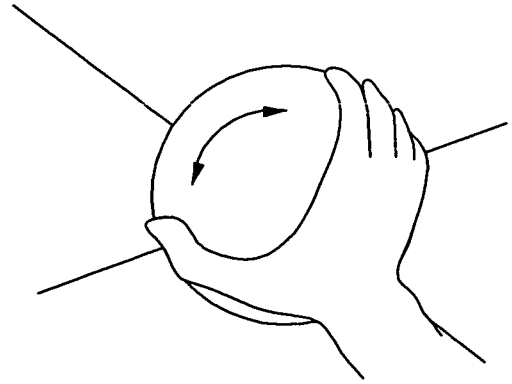

INPUT DEVICE

CROSS-REFERENCE TO RELATED APPLICATIONS

This application claims the priority benefit of Korean Patent Application No. 10-2008-0116079, filed on Nov. 21, 2008, in the Korean Intellectual Property Office, the disclosure of which is incorporated herein by reference.

BACKGROUND

1. Field

Exemplary embodiments relate to an input device, and more particularly, to an input device which provides a user with an intuitive input interface, and thereby may enable the user to easily control an object displayed on a display device.

2. Description of the Related Art

Currently, the release of various types of information devices increases users' interests regarding various types of input devices that may control the information devices. Generally, a mouse, a keyboard, and the like are being used in a computer and the like as an input device.

The input device such as the mouse may provide an input interface based on a Graphical User Interface (GUI) and thus may be readily used among many users using an information device such as the computer. However, existing input devices may be generally appropriate for a command line interface or a two-dimensional (2D) GUI. Therefore, a user that is unfamiliar with a latest information device, for example, a child, an elderly and frail person, and the like, may have difficulties in using the input devices.

In particular, as a three-dimensional (3D) game or 3D Internet is being currently generalized, there is an increasing need for an input device that may control an object that is displayed on a virtual 3D space. However, since the existing input devices are manufactured based on the 2D input interface, they may be inappropriate for controlling the object in the virtual 3D space. Accordingly, there is a need for a research regarding an input device that may provide a user with a convenient interface in a virtual 3D space.

SUMMARY

Exemplary embodiments may provide an input device which senses a touch and a motion generated by a user, generates an input signal to control an object displayed on a display device, and thereby may provide the user with an intuitive and convenient input interface.

According to exemplary embodiments, there may be provided an input device including: a touch sensing unit to sense a touch and generate a first sensing signal with respect to the sensed touch; a motion sensing unit to sense a motion and generate a second sensing signal with respect to the sensed motion; an input signal generation unit to generate an input signal based on the first sensing signal and the second sensing signal; and a transmission unit to transmit the input signal to a display device, wherein the display device controls an object displayed on the display device based on the input signal, when the input signal is received.

According to exemplary embodiments, there may be provided an input device including: a touch sensing unit to sense a touch and generate a first sensing signal with respect to the sensed touch; a motion sensing unit to sense a motion and generate a second sensing signal with respect to the sensed motion; and a transmission unit to transmit the first sensing signal and the second sensing signal to a display device, wherein the display device controls an object displayed on the display device based on the first sensing signal and the second sensing signal, when the first sensing signal and the second sensing signal are received.

Additional aspects of exemplary embodiments will be set forth in part in the description which follows and, in part, will be apparent from the description, or may be learned by practice of the disclosure.

BRIEF DESCRIPTION OF THE DRAWINGS

These and/or other aspects of exemplary embodiments will become apparent and more readily appreciated from the following description, taken in conjunction with the accompanying drawings of which:

FIG. 3 is a diagram illustrating an example of an operation of an input device according to exemplary embodiments;

FIG. 6 is a diagram illustrating an example of an operation of an input device according to other exemplary embodiments;

FIG. 8 is a diagram illustrating an example of an operation of an input device according to still other exemplary embodiments;

FIG. 10 is a diagram illustrating an example of an operation of an input device according to yet other exemplary embodiments;

DETAILED DESCRIPTIONS

Figure 1:
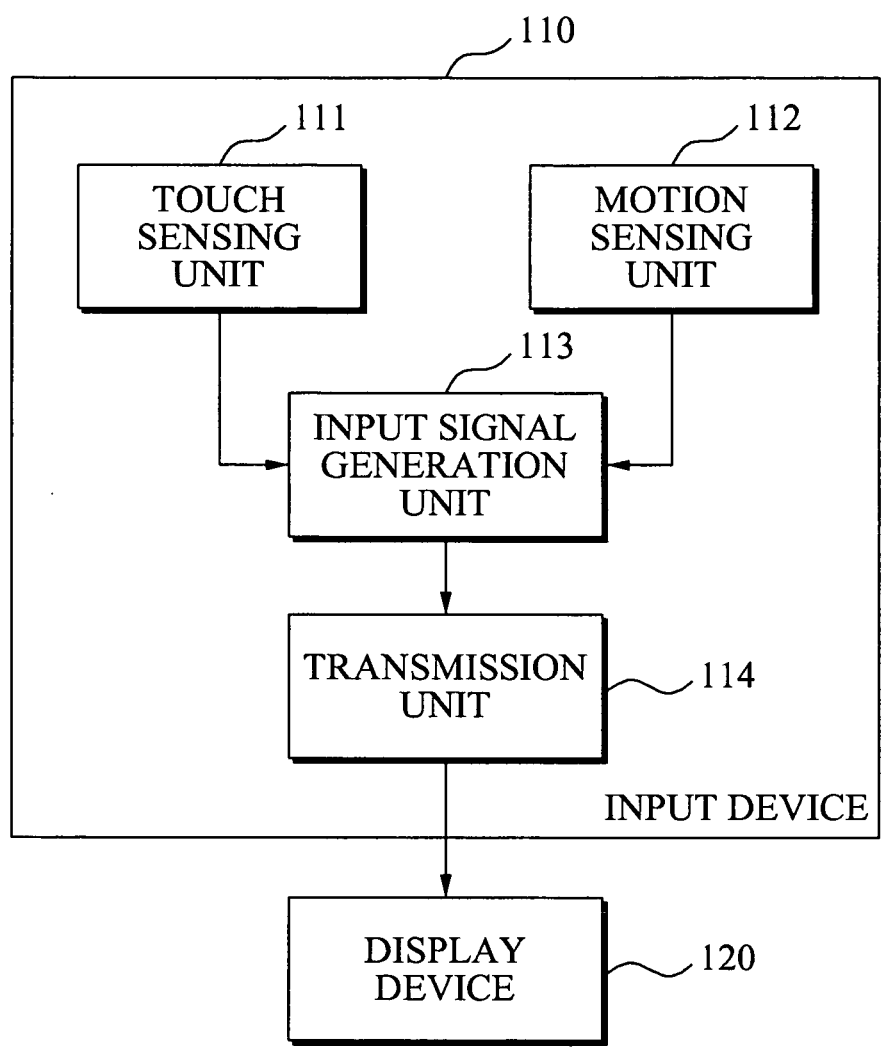
FIG. 1 is a block diagram illustrating a configuration of an input device according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a block diagram illustrating a configuration of an input device 110 according to exemplary embodiments. The input device 110 and a display device 120 are illustrated in FIG. 1. The input device 110 may include a touch sensing unit 111, a motion sensing unit 112, an input signal generation unit 113, and a transmission unit 114.

According to exemplary embodiments, the input device 110 may sense a user's touch and the user's motion with respect to the input device 110 to intuitively control an object displayed on a display device 120. For this, the input device 110 may be in a spherical shape to enable the user to easily operate the input device 110. Accordingly, when the user makes a motion such as rolling the input device 110 forward or backward, and the like, the input device 110 may sense the motion, control the object, and thereby may provide the user with a more intuitive input interface. For example, it may be assumed that the user controls a pointer displayed on the display device 120. When the user rolls the input device 110 forward, the input device 110 may sense the user's touch and motion with respect to the input device 110, and thereby may control the pointer to move to a top portion on the display device 120.

As described above, the input device 110 may be in a spherical shape, and thereby may provide the user with an intuitive input interface. However, the input device 110 may not be limited to the exemplary embodiments. That is, the input device 110 may have various shapes, which is described in detail with reference to FIG. 2.

Figure 2:
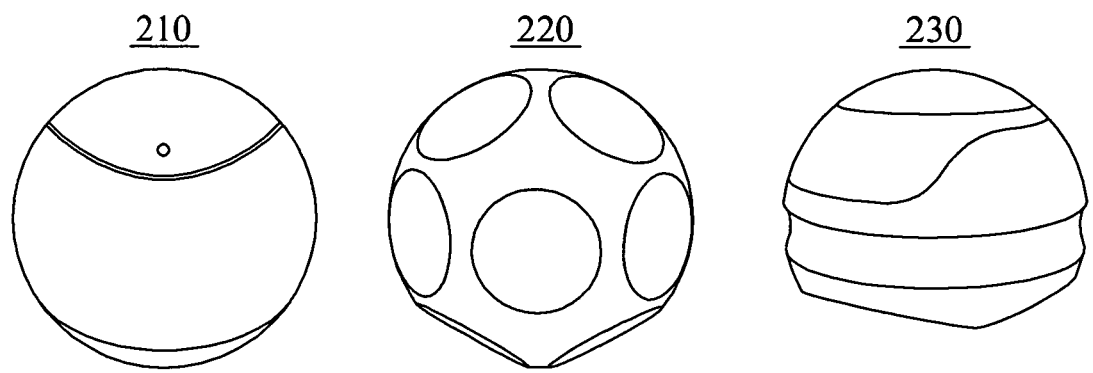
FIG. 2 is a diagram illustrating examples of a shape of an input device according to exemplary embodiments.

FIG. 2 is a diagram illustrating examples of a shape of the input device 110 according to exemplary embodiments. The input device 110 is in a spherical shape in an example 210. In this instance, a bottom part of the input device 110 may be formed as a wheel or a curved surface to reduce friction between the input device 110 and a ground to enable the user to drag the input device 110 easily. In the example 210 of the input device 110, the user may control an object displayed on the display device 120 by dragging the input device 110, as opposed to rolling the input device 110 to control the object.

The input device 110 is in a spherical shape with cut surfaces in an example 220. In the example 220 of the input device 110, the user may rotate and move the input device 110 based on the cut surfaces of the input device 110.

In an example 230 of the input device 110, a bottom part of the input device 110 may be cut into four sides in a tilted direction, and flattened so that the input device 110 is stable on a ground. In the example 230 of the input device 110, the user may control the object displayed on the display device 120 by tilting the input device 110 in four directions corresponding to the four cut sides.

The examples 210, 220, and 230 of the input device 110 have been described with reference to FIG. 2. However, the input device 110 may not limited to the examples, and may have a variety of shapes. Hereinafter, the configuration of the input device 110 is described in greater detail with reference to FIG. 1.

The touch sensing unit 111 may sense a touch and generate a first sensing signal with respect to the sensed touch. According to exemplary embodiments, the touch sensing unit 111 may include at least one touch sensing module (not shown) to sense the touch.

The motion sensing unit 112 may sense a motion and generate a second sensing signal with respect to the sensed motion. According to exemplary embodiments, the motion sensing unit 112 may include at least one motion sensing module (not shown) to sense the motion.

The input signal generation unit 113 may generate an input signal based on the first sensing signal and the second sensing, and the transmission unit 114 may transmit the input signal to the display device 120. When receiving the input signal, the display device 120 may control the object displayed on the display device 120 based on the input signal.

Accordingly, the input device 110 may sense the user's touch and the user's motion, generate the input signal, transmit the input signal to the display device 120, and thereby may enable the user to easily control the object displayed on the display device 120.

According to exemplary embodiments, the touch sensing unit 111 may include a pressure sensing module (not shown) to sense a pressure when the user applies the pressure to the input device 110.

According to exemplary embodiments, the input signal generation unit 113 may include a determination unit (not shown) and a control information generation unit (not shown). When the touch sensing unit 111 senses the pressure, the determination unit may determine whether the pressure is greater than a threshold value based on the first sensing signal. Also, when the determination unit determines that the pressure is greater than the threshold value, the control information generation unit may generate control information of the object based on a pattern of the pressure. The control information may correspond to the pressure. In this instance, the input signal may include the control information. Also, the display device 120 may extract the control information from the input signal, and control the object based on the control information.

According to exemplary embodiments, when the object is a two-dimensional (2D) pointer, the control information generation unit may generate the control information including a run command information about a second object that the 2D pointer indicates. For example, it may be assumed that the user performs a pointing operation. Also, it may be assumed that a pointer displayed on the display device 120 is located on a file A. In this instance, when the user applies predetermined pressure to the spherical input device 110, the input device 110 may sense the pressure and enable the file A to be executed.

Also, according to exemplary embodiments, when the object is in a virtual 3D space, the control information generation unit may generate the control information to enable the object to drop according to a vertical coordinate axis. For example, it may be assumed that the user controls an avatar in a virtual 3D space. When the user applies predetermined pressure to the input device 110, the input device 110 may control the avatar to move to a ground.

According to exemplary embodiments, the touch sensing unit 111 may include a proximity touch sensing module (not shown) to sense proximity touch. In this instance, according to exemplary embodiments, when the touch sensing unit 111 senses the proximity touch, the input signal generation unit 113 may generate control information of the object. The control information may correspond to the proximity touch. In this instance, the input signal may include the control information. Also, the display device 120 may extract the control information from the input signal, and control the object based on the control information.

According to exemplary embodiments, the input signal generation unit 113 may generate the control information to enable the object to be activated. For example, it may be assumed that the user controls an avatar in a virtual 3D space. When the user's hand is close to the input device 110, the input device 110 may sense the proximity touch generated by the user, and enable the avatar to be conspicuously shown. Accordingly, the input device 110 may show that the avatar may be controlled on the display device 120. That is, the avatar may be activated.

According to exemplary embodiments, the motion sensing unit 112 may include a movement sensing module (not shown). The movement sensing module may sense a movement when the user moves the input device 110. In this instance, according to exemplary embodiments, the input signal generation unit 113 may include a determination unit (not shown) and a movement information generation unit (not shown).

The determination unit may determine whether an amount of the movement is greater than a threshold value based on the second sensing signal, when the motion sensing unit 112 senses the movement.

Also, the movement information generation unit may generate movement information of the object, when the determination unit determines that the amount of the movement is greater than the threshold value. The movement information may correspond to the movement. In this instance, the input signal may include the movement information. Also, the display device 120 may extract the movement information from the input signal, and control the object based on the movement information.

According to exemplary embodiments, the movement information may include movement direction information of the object. The movement direction information may correspond to a direction of the movement. For example, it may be assumed that the user performs a pointing operation. In this instance, when the user rolls the input device 110 forward, the input device 110 may sense the movement, and move a pointer displayed on the display device 120 to a particular direction. In this instance, according to exemplary embodiments, the motion sensing unit 112 may sense the movement of the input device 110 in a 3D space through the movement sensing module. In this instance, according to exemplary embodiments, the movement information generation unit may generate 3D movement information of the object. The 3D movement information may correspond to the movement of the input device 110 in the 3D space. For example, it may be assumed that the user controls an avatar in a virtual 3D space. When the user lifts the input device 110, the input device 110 may sense the movement in the 3D space, and may control the avatar, displayed on the display device 120, to make a motion such as jumping, flying to a sky, and the like in the virtual 3D space.

Also, according to exemplary embodiments, when the user moves the input device 110 with increasing speed, the motion sensing unit 112 may sense a change of a speed of the movement through the movement sensing module. In this instance, according to exemplary embodiments, the movement information generation unit may generate the movement information based on the change of the speed. For example, it may be assumed that the user controls an avatar in a virtual 3D space. When the user rolls the input device 110 forward with increasing speed, the input device 110 may sense the movement, and control the avatar displayed on the display device 120 to move forward more quickly in the virtual 3D space.

Also, according to exemplary embodiments, the motion sensing unit 112 may sense a change in the amount of the movement through the movement sensing module. In this instance, according to exemplary embodiments, the movement information generation unit may generate the movement information based on the change in the amount of the movement. For example, it may be assumed that the user controls an avatar in a virtual 3D space. When the user rolls the input device 110 forward as an amount of a movement increases, the input device 110 may sense the amount of the movement of the input device 110, and control the avatar displayed on the display device 120 to move forward more quickly in the virtual 3D space.

According to exemplary embodiments, the motion sensing unit 112 may include a rotation sensing module (not shown). The rotation sensing module may sense a rotation when the user rotates the input device 110. In this instance, according to exemplary embodiments, the input signal generation unit 113 may include a determination unit (not shown) and a rotation information generation unit (not shown). The determination unit may determine whether an amount of the rotation is greater than a threshold value based on the second sensing signal, when the motion sensing unit 112 senses the rotation.

Also, the rotation information generation unit may generate rotation information of the object when the determination unit determines that the amount of the rotation is greater than the threshold value. The rotation information may correspond to the rotation. In this instance, the input signal may include the rotation information. Also, the display device 120 may extract the rotation information from the input signal, and control the object based on the rotation information. For example, it may be assumed that the user performs a pointing operation. In this instance, when the user rotates the input device 110, the input device 110 may sense the rotation, and control a pointer displayed on the display device 120 to be rotated.

Hereinafter, examples of an operation of the input device 110 are described in detail with reference to FIGS. 3 through 10. Here, it may be assumed that the input device 110 illustrated in FIGS. 3 through 10 is in a spherical shape.

FIG. 3 is a diagram illustrating an example of an operation of an input device 110 according to exemplary embodiments. It may be assumed that a user uses the input device 110 to control a pointer displayed on a display device 120.

An example 310 illustrates that the user moves the input device 110. As illustrated in the example 310, when the user rolls the spherical input device 110 on a ground in directions of arrows, the input device 110 may sense a touch and a motion on the input device 110, and control the pointer displayed on the display device 120 to move in the directions of the arrows. The example 310 of the input device 110 is described in greater detail with reference to FIG. 4.

Figure 4:
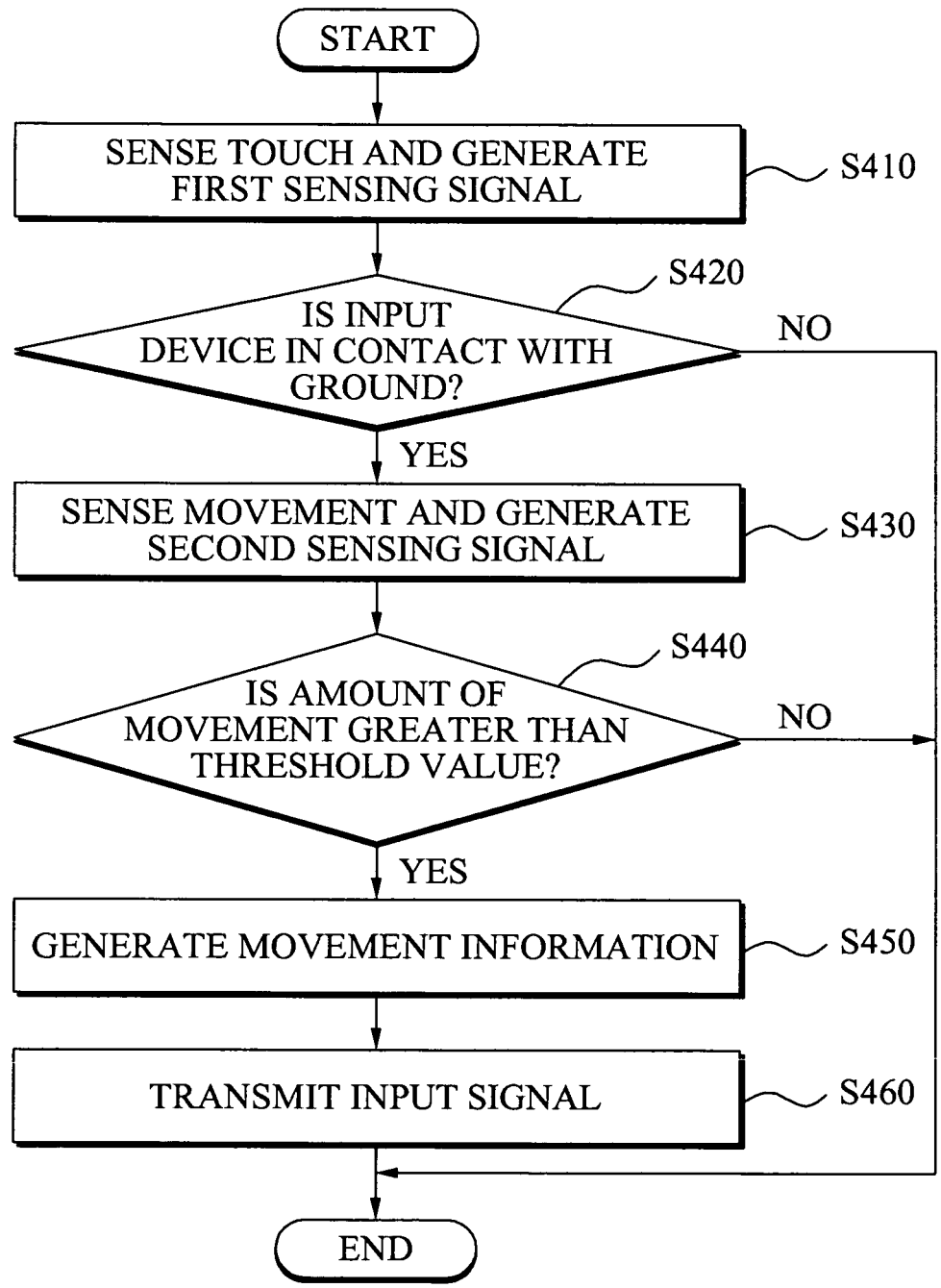
FIG. 4 is a flowchart illustrating an operation of an input device according to exemplary embodiments.

FIG. 4 is a flowchart illustrating an operation of the input device 110 according to exemplary embodiments.

In operation S410, a touch sensing unit 111 may sense a touch generated on the input device 110 and generate a first sensing signal. Specifically, the touch sensing unit 111 may sense a first touch between a user and the input device 110 and a second touch between the input device 110 and a ground, and may generate the first sensing signal. Since the user may lift the input device 110, the touch sensing unit 111 may sense the second touch. That is, since the user may make a motion on the 2D ground as well as in a 3D space, the touch sensing unit 111 may sense the second touch.

In operation S420, an input signal generation unit 113 may analyze the first sensing signal and determine whether the input device 110 is in contact with the ground. When the touch sensing unit 111 does not sense the second touch, the input signal generation unit 113 may determine that the input device 110 is not in contact with the ground. When it is determined that the input device 110 is not in contact with the ground in operation S420, the operation to control a pointer may be completed. However, in the case it is determined that the input device 110 is in contact with the ground in operation S420, a motion sensing unit 112 may sense a movement of the input device 110 and generate a second sensing signal in operation S430.

According to exemplary embodiments, the input signal generation unit 113 may include a determination unit (not shown) and a movement information generation unit (not shown). In operation S440, the determination unit may compare an amount of the movement of the input device 110 and a predetermined threshold value, and determine whether the amount of the movement is greater than the threshold value. When it is determined that the amount of the movement is equal to or less than the threshold value in operation S440, the operation to control the pointer may be completed.

However, when it is determined that the amount of the movement is greater than the threshold value in operation S440, the movement information generation unit may generate movement information of the pointer in operation S450. In this instance, the movement information may correspond to the movement of the input device 110. That is, as illustrated in the example 310, when the user moves the input device 110 in the directions of the arrows, the movement information generation unit may generate the movement information to enable the pointer to move in the directions of the arrows. In this instance, an input signal may include the movement information.

In operation S460, a transmission unit 114 may transmit the input signal to the display device 120. When the input signal is received from the input device 110, the display device 120 may extract the movement information from the input signal and control the pointer based on the movement information. When the user moves the input device 110 in the arrow direction, the pointer displayed on the display device 120 may move in the arrow direction.

The example 310 of the operation of the input device 110 has been described with reference to FIG. 4. Hereinafter, an example 320 of an operation of the input device 110 is described in detail with reference to FIG. 3.

The example 320 illustrates that the user applies a pressure to the input device 110 to control the pointer. As illustrated in the example 320, when the user applies the pressure to the input device 110 in an arrow direction, the input device 110 may sense the pressure and touch generated on the input device 110, and provide a predetermined run command through the pointer displayed on the display device 120. For example, when the pointer is located on a predetermined file, the user may control the file to be selected or executed by applying pressure to the input device 110, which is described in greater detail with reference to FIG. 5.

Figure 5:
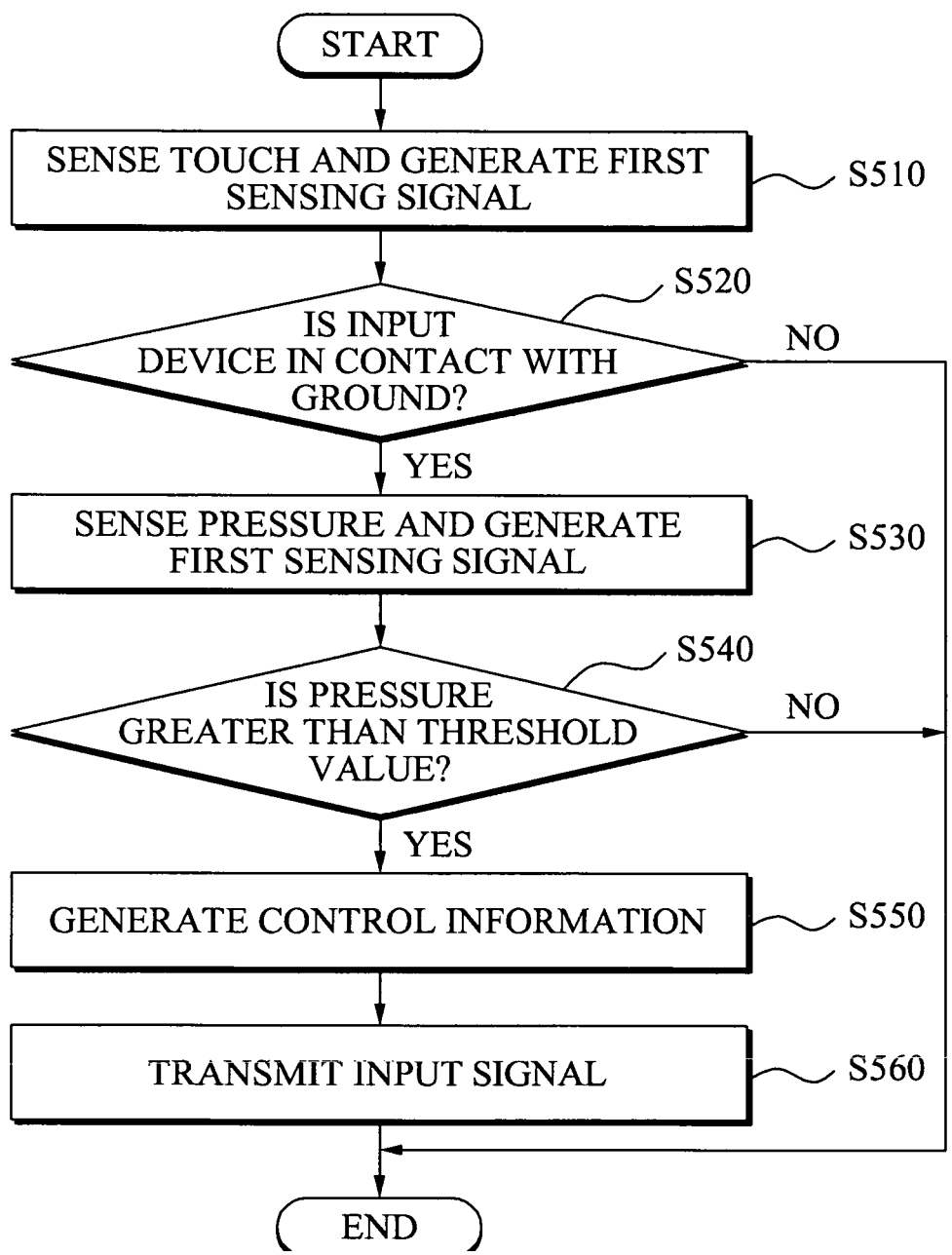
FIG. 5 is a flowchart illustrating an operation of an input device according to other exemplary embodiments.

FIG. 5 is a flowchart illustrating an operation of an input device 110 according to other exemplary embodiments.

In operation S510, a touch sensing unit 111 may sense a touch generated on the input device 110 and generate a first sensing signal. Specifically, the touch sensing unit 111 may sense a first touch between a user and the input device 110 and a second touch between the input device 110 and a ground, and may generate the first sensing signal. Since the user may lift the input device 110, the touch sensing unit 111 may sense the second touch. That is, since the user may make a motion on the 2D ground as well as in a 3D space, the touch sensing unit 111 may sense the second touch.

In operation S520, an input signal generation unit 113 may analyze the first sensing signal and determine whether the input device 110 is in contact with the ground. When the touch sensing unit 111 does not sense the second touch, the input signal generation unit 113 may determine that the input device 110 is not in contact with the ground. When it is determined that the input device 110 is not in contact with the ground in operation S520, the operation to control a pointer may be completed. However, in the case it is determined that the input device 110 is in contact with the ground in operation S520, the touch sensing unit 111 may sense a pressure on the input device 110 and generate the first sensing signal in operation S530.

According to exemplary embodiments, the input signal generation unit 113 may include a determination unit (not shown) and a control information generation unit (not shown). In operation S540, the determination unit may compare the pressure on the input device 110 and a predetermined threshold value, and determine whether the pressure is greater than the threshold value. When it is determined that the pressure is equal to or less than the threshold value in operation S540, the operation to control the pointer may be completed.

However, when it may be determined that the pressure is greater than the threshold value in operation S540, the control information generation unit may generate control information of the pointer in operation S550. In this instance, the control information may correspond to the pressure. That is, as illustrated in the example 320, when the user applies the pressure to the input device 110 in an arrow direction, the control information generation unit may generate the control information to enable a predetermined run command to be executed through the pointer. In this instance, an input signal may include the control information.

In operation S560, a transmission unit 114 may transmit the input signal to the display device 120. When the input signal is received from the input device 110, the display device 120 may extract the control information from the input signal and control the pointer based on the control information.

FIG. 6 is a diagram illustrating an example of an operation of an input device 110 according to other exemplary embodiments. It may be assumed that a user uses the input device 110 to control an avatar in a virtual 3D space.

An example 610 and an example 620 illustrate that the user moves the input device 110 as speed changes. As illustrated in the example 610, the user may control the avatar to move forward or backward by rolling the input device 110 forward or backward. In particular, when the user rolls the input device 110 forward with increasing speed, the input device 110 may sense the accelerated movement, and control the avatar to move forward more quickly. Similarly, when the user rolls the input device 110 backward with increasing speed, the input device 110 may sense the accelerated movement, and control the avatar to move backward more quickly. Also, as illustrated in the example 620, when the user rolls the input device 110 left or right with increasing speed, the input device 110 may sense the accelerated movement, and control the avatar to move left or right more quickly. The example 610 and the example 620 of the input device 110 are described in detail with reference to FIG. 7.

Figure 7:
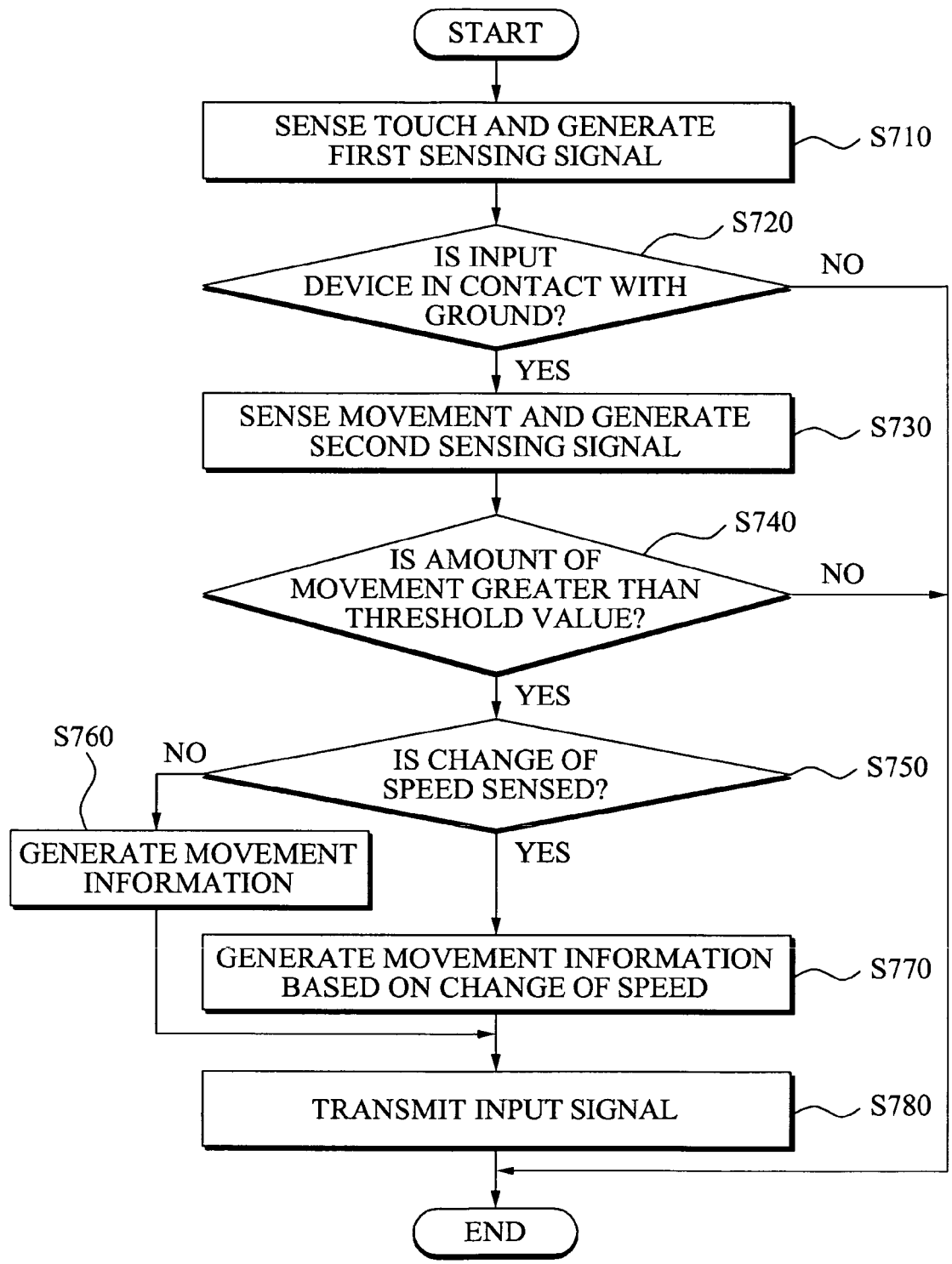
FIG. 7 is a flowchart illustrating an operation of an input device according to still other exemplary embodiments.

FIG. 7 is a flowchart illustrating an operation of an input device 110 according to still other exemplary embodiments.

In operation S710, a touch sensing unit 111 may sense a touch generated on the input device 110 and generate a first sensing signal. Specifically, the touch sensing unit 111 may sense a first touch between a user and the input device 110 and a second touch between the input device 110 and a ground, and may generate the first sensing signal. Since the user may lift the input device 110, the touch sensing unit 111 may sense the second touch. That is, since the user may make a motion on the 2D ground as well as in a 3D space, the touch sensing unit 111 may sense the second touch.

In operation S720, an input signal generation unit 113 may analyze the first sensing signal and determine whether the input device 110 is in contact with the ground. When the touch sensing unit 111 does not sense the second touch, the input signal generation unit 113 may determine that the input device 110 is not in contact with the ground. When it is determined that the input device 110 is not in contact with the ground in operation S720, the operation to control the avatar may be completed. However, in the case it is determined that the input device 110 is in contact with the ground in operation S720, a motion sensing unit 112 may sense a movement of the input device 110 and generate a second sensing signal in operation S730.

According to exemplary embodiments, the input signal generation unit 113 may include a determination unit (not shown) and a movement information generation unit (not shown). In operation S740, the determination unit may compare an amount of the movement of the input device 110 and a predetermined threshold value, and determine whether the amount of the movement is greater than the threshold value. When it is determined that the amount of the movement is equal to or less than the threshold value in operation S740, the operation to control the avatar may be completed.

However, when it is determined that the amount of the movement is greater than the threshold value in operation S740, it may be determined whether the motion sensing unit 112 may sense a change of a speed of the movement of the input device 110 in operation S750. When it is determined that the motion sensing unit 112 does not sense the change of the speed in operation S750, the movement information generation unit may generate movement information of the avatar in operation S760. The movement information of the avatar may correspond to the movement of the input device 110.

However, when it is determined that the motion sensing unit 112 senses the change of the speed in operation S750, the movement information generation unit may generate movement information of the avatar based on the change of the speed in operation S770. That is, when the user rolls the input device 110 forward at a same speed, the input device 110 may generate the movement information to enable the avatar to move forward at a same speed.

However, when the user rolls the input device 110 forward with increasing speed, the input device 110 may generate the movement information to enable the avatar to move forward with increasing speed. In this instance, an input signal may include the movement information.

In operation S780, a transmission unit 114 may transmit the input signal to the display device 120. When the input signal is received from the input device 110, the display device 120 may extract the movement information from the input signal and control the pointer based on the movement information.

FIG. 8 is a diagram illustrating an example of an operation of an input device 110 according to still other exemplary embodiments. It may be assumed that a user uses the input device 110 to control an avatar in a virtual 3D space.

An example 810 illustrates that the user lifts the input device 110. According to exemplary embodiments, as illustrated in the example 810, when the user lifts the input device 110, the input device 110 may sense the user's touch and motion and control the avatar to jump or fly to a sky in the virtual 3D space.

An example 820 illustrates that the user applies a pressure to the input device 110. According to exemplary embodiments, as illustrated in the example 820, when the user applies the pressure to the input device 110, the input device 110 may sense the user's touch and pressure and control the avatar to come down from the sky. That is, the input device 110 may sense a movement in a 3D space, and generate 3D movement information of the avatar, which is described in detail with reference to FIG. 9.

Figure 9:
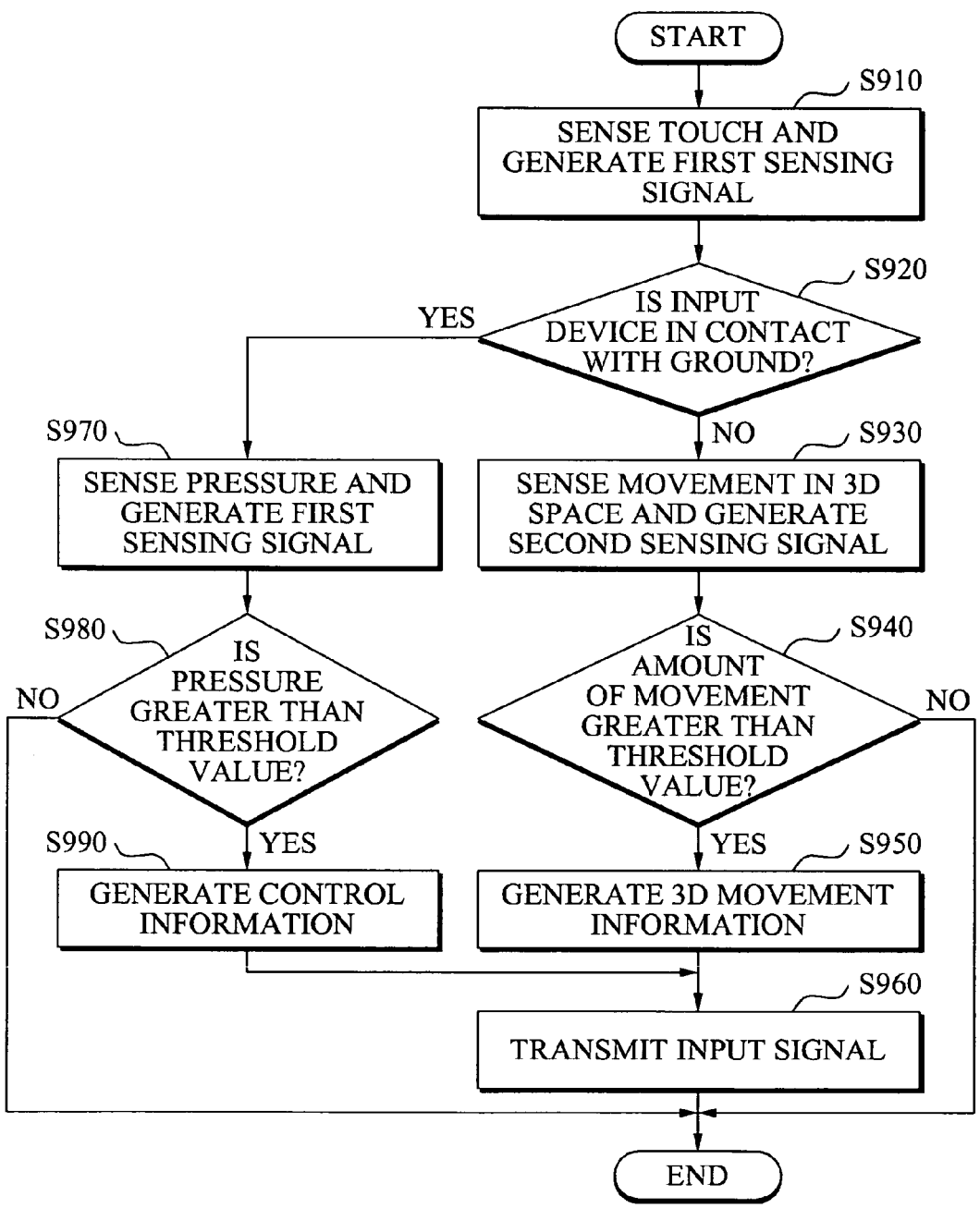
FIG. 9 is a flowchart illustrating an operation of an input device according to yet other exemplary embodiments.

FIG. 9 is a flowchart illustrating an operation of an input device 110 according to yet other exemplary embodiments.

In operation S910, a touch sensing unit 111 may sense a touch generated on the input device 110 and generate a first sensing signal. Specifically, the touch sensing unit 111 may sense a first touch between a user and the input device 110 and a second touch between the input device 110 and a ground, and may generate the first sensing signal. Since the user may lift the input device 110, the touch sensing unit 111 may sense the second touch. That is, since the user may make a motion on the 2D ground as well as in the 3D space, the touch sensing unit 111 may sense the second touch.

In operation S920, an input signal generation unit 113 may analyze the first sensing signal and determine whether the input device 110 is in contact with the ground. When the touch sensing unit 111 does not sense the second touch, the input signal generation unit 113 may determine that the input device 110 is not in contact with the ground.

When it is determined that the input device 110 is not in contact with the ground in operation S920, a motion sensing unit 112 may sense a movement of the input device 110 in the 3D space and generate a second sensing signal in operation S930. That is, when the touch sensing unit 111 does not sense the second touch, the input signal generation unit 113 may determine that the input device 110 moves in the 3D space. Also, the motion sensing unit 112 may sense the movement in the 3D space. That is, as illustrated in the example 810, when the user lifts the input device 110, the input device 110 may sense the movement of the input device 110 in the 3D space.

According to example embodiments, the input signal generation unit 113 may include a determination unit (not shown) and a movement information generation unit (not shown). In operation S940, the determination unit may compare an amount of the movement of the input device 110 and a predetermined threshold value, and determine whether the amount of the movement is greater than the threshold value. When it may be determined that the amount of the movement is equal to or less than the threshold value in operation S940, the operation to control the avatar may be completed.

However, when it is determined that the amount of the movement is greater than the threshold value in operation S940, the movement information generation unit may generate 3D movement information of the avatar in operation S950. In this instance, the 3D movement information may correspond to the movement of the input device 110. That is, when the user lifts the input device 110, the input device 110 may generate the 3D movement information to enable the avatar to jump or fly to a sky in the virtual 3D space. In this instance, an input signal may include the 3D movement information.

In operation S960, a transmission unit 114 may transmit the input signal to the display device 120. When the input signal is received from the input device 110, the display device 120 may extract the 3D movement information from the input signal and control the avatar based on the 3D movement information. However, when it is determined that the input device 110 is in contact with the ground in operation S920, the touch sensing unit 111 may sense a pressure on the input device 110 and generate a first sensing signal in operation S970.

According to exemplary embodiments, the input signal generation unit 113 may include a determination unit (not shown) and a control information generation unit (not shown). In operation S980, the determination unit may compare the pressure on the input device 110 and a predetermined threshold value, and determine whether the pressure is greater than the threshold value. When it is determined that the pressure is equal to or less than the threshold value in operation S980, the operation to control the avatar may be completed.

However, when it is determined that the pressure is greater than the threshold value in operation S980, the control information generation unit may generate control information of the avatar in operation S990. In this instance, the control information may correspond to the pressure. That is, as illustrated in the example 820, when the user applies the pressure to the input device 110 in the arrow direction, the control information generation unit may generate the control information to enable the avatar to come down from the sky in the virtual 3D space. In this instance, the input signal may include the control information.

In operation S960, the transmission unit 114 may transmit the input signal to the display device 120. When the input signal is received from the input device 110, the display device 120 may extract the control information from the input signal and control the avatar based on the control information.

FIG. 10 is a diagram illustrating an example of an operation of an input device 110 according to yet other exemplary embodiments. It may be assumed that a user uses the input device 110 to control an avatar in a virtual 3D space.

An example 1010, an example 1020, and an example 1030 illustrate that the user rotates the input device 110. When the user rotates the input device 110 as illustrated in the example 1010, the example 1020, and the example 1030, the input device 110 may sense the touch and the rotation, and control the avatar or a point of view for display to be rotated, which is described in detail with reference to FIG. 11.

Figure 11:
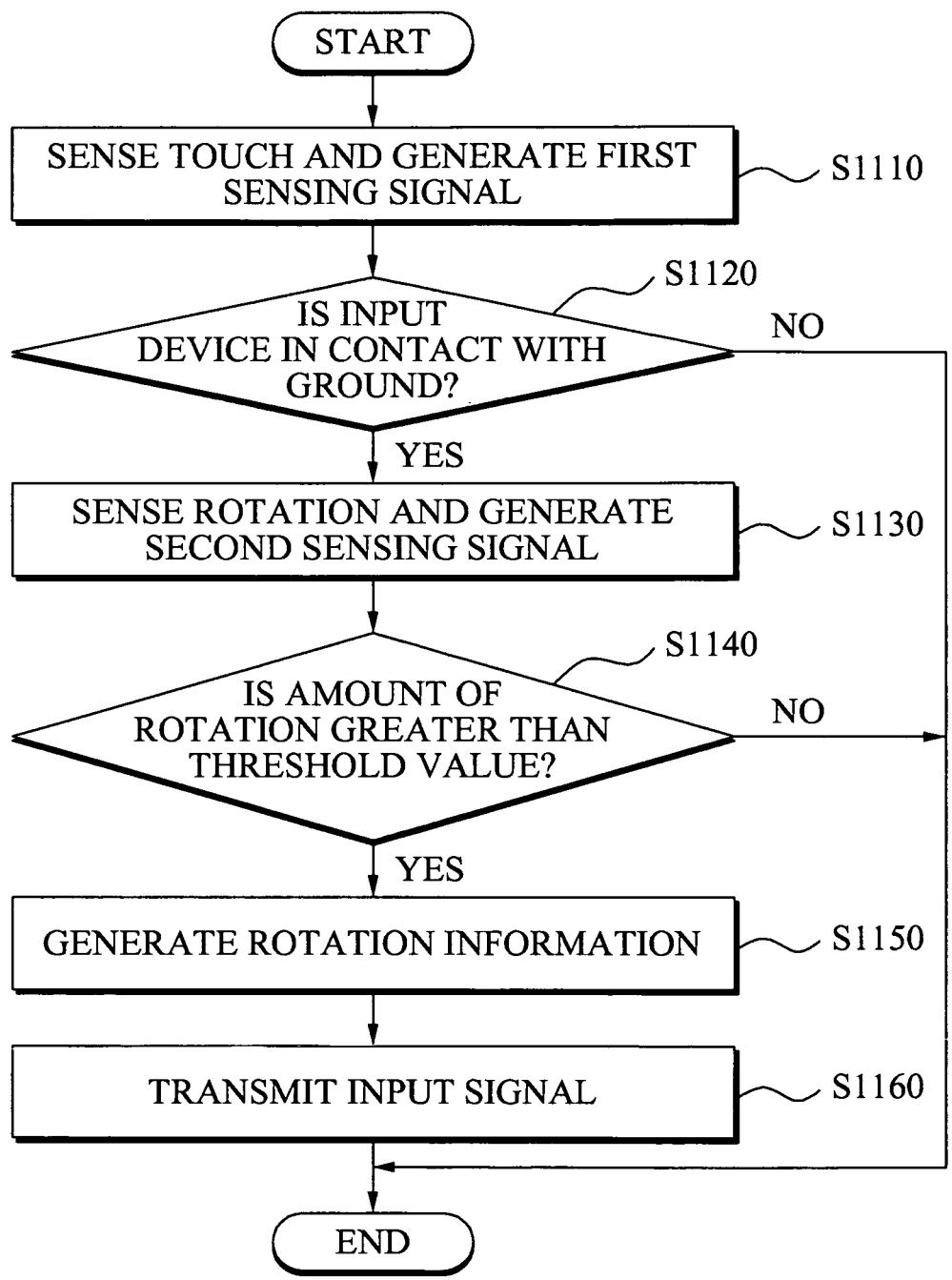
FIG. 11 is a flowchart illustrating an operation of an input device according to further exemplary embodiments.

FIG. 11 is a flowchart illustrating an operation of an input device 110 according to further exemplary embodiments.

In operation S1110, a touch sensing unit 111 may sense a touch generated on the input device 110 and generate a first sensing signal. Specifically, the touch sensing unit 111 may sense a first touch between the user and the input device 110 and a second touch between the input device 110 and a ground, and may generate the first sensing signal. Since the user may lift the input device 110, the touch sensing unit 111 may sense the second touch. That is, since the user may make a motion on the 2D ground as well as in a 3D space, the touch sensing unit 111 may sense the second touch.

In operation S1120, an input signal generation unit 113 may analyze the first sensing signal and determine whether the input device 110 is in contact with the ground. When the touch sensing unit 111 does not sense the second touch, the input signal generation unit 113 may determine that the input device 110 is not in contact with the ground. When it is determined that the input device 110 is not in contact with the ground in operation S1120, the operation to control the avatar may be completed. However, it may be determined that the input device 110 is in contact with the ground in operation S1120, a motion sensing unit 112 may sense the rotation of the input device 110 and generate a second sensing signal in operation S1130.

According to exemplary embodiments, the input signal generation unit 113 may include a determination unit (not shown) and a rotation information generation unit (not shown). In operation S1140, the determination unit may compare an amount of the rotation of the input device 110 and a predetermined threshold value, and determine whether the amount of the rotation is greater than the threshold value. When it is determined that the amount of the rotation is equal to or less than the threshold value in operation S1140, the operation to control the avatar may be completed.

However, when it is determined that the amount of the rotation is greater than the threshold value in operation S1140, a motion sensing unit 112 may generate rotation information of the avatar in operation S1150. In this instance, the rotation information may correspond to the rotation of the input device 110. That is, when the user rotates the input device 110, the input device 110 may generate the rotation information to enable the avatar to be rotated. In this instance, an input signal may include the movement information.

In operation S1160, a transmission unit 114 may transmit the input signal to the display device 120. When the input signal is received from the input device 110, the display device 120 may extract the rotation information from the input signal and control the avatar based on the rotation information.

Figure 12:
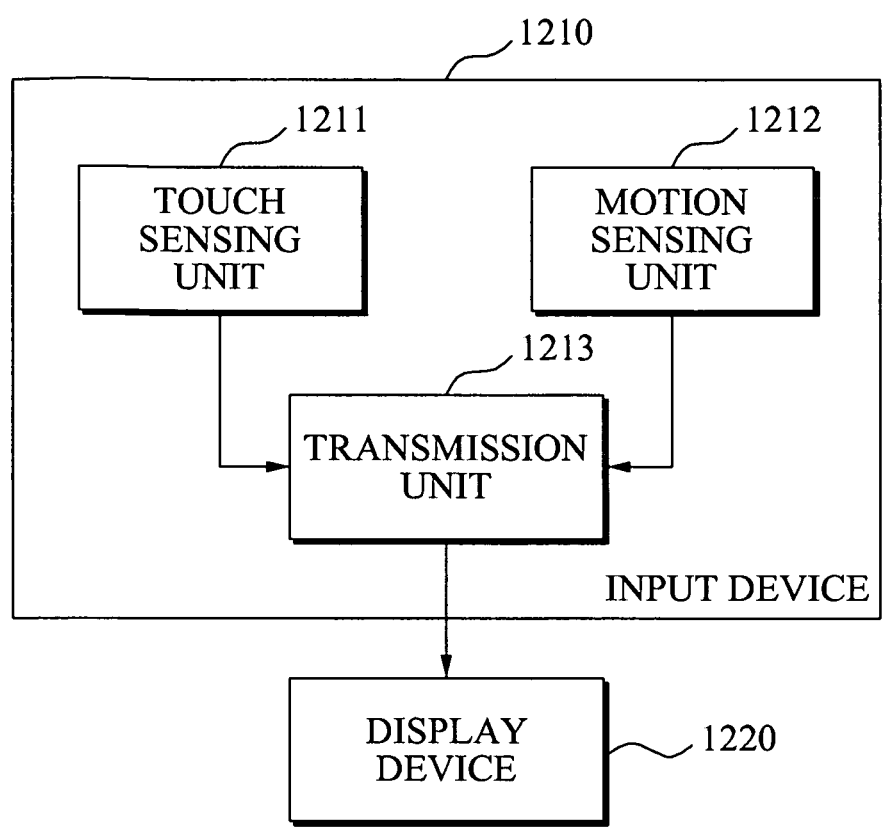
FIG. 12 is a block diagram illustrating a configuration of an input device according to other exemplary embodiments.

FIG. 12 is a block diagram illustrating a configuration of an input device 1210 according to other exemplary embodiments.

The input device 1210 and a display device 1220 are illustrated in FIG. 12. The input device 1210 may include a touch sensing unit 1211, a motion sensing unit 1212, and a transmission unit 1213. The touch sensing unit 1211 may sense a touch and generate a first sensing signal with respect to the sensed touch.

According to further exemplary embodiments, the touch sensing unit 1211 may include at least one touch sensing module (not shown) to sense the touch. The motion sensing unit 1212 may sense a motion and generate a second sensing signal with respect to the sensed motion.

According to further exemplary embodiments, the motion sensing unit 1212 may include at least one motion sensing module (not shown) to sense the motion.

The transmission unit 1213 may transmit the first sensing signal and the second sensing signal to the display device 1220.

When the first sensing signal and the second sensing signal are received, the display device 1220 may control an object, displayed on the display device 1220, based on the first sensing signal and the second sensing signal.

According to exemplary embodiments, the touch sensing unit 1211 may include a pressure sensing module (not shown) to sense a pressure on the input device 1210. In this instance, when the touch sensing unit 1211 senses the pressure, the display device 1220 may determine whether the pressure is greater than a threshold value. When the pressure is greater than the threshold value, the display device 1220 may generate control information of the object and control the object based on the control information. In this instance, the control information may correspond to the pressure.

Also, according to exemplary embodiments, the touch sensing unit 1211 may include a proximity touch sensing module (not shown) to sense proximity touch on the input device 1210. When the touch sensing unit 1211 senses the proximity touch, the display device 1220 may generate control information of the object and control the object based on the control information. In this instance, the control information may correspond to the proximity touch.

Also, according to exemplary embodiments, the motion sensing unit 1212 may include a movement sensing module (not shown) to sense a movement of the input device 1210. When the motion sensing unit 1212 senses the movement, the display device 1220 may determine whether an amount of the movement is greater than a threshold value. When the amount of the movement is greater than the threshold value, the display device 1220 may generate movement information of the object and control the object based on the movement information. In this instance, the movement information may correspond to the movement.

Also, according to exemplary embodiments, the motion sensing unit 1212 may sense a change in the amount of the movement using the movement sensing module. In this instance, the display device 1220 may generate the movement information of the object based on the change in the amount of the movement, and control the object based on the movement information.

According to exemplary embodiments, the movement sensing module may sense a movement in a 3D space. In this instance, the display device 1220 may generate 3D movement information of the object and control the object based on the 3D movement information. The 3D movement information may correspond to the movement in the 3D space.

Also, according to exemplary embodiments, the movement sensing module may sense a change of a speed of the movement. In this instance, the display device 1220 may generate the movement information of the object based on the change of the speed, and control the object based on the movement information.

Also, according to exemplary embodiments, the motion sensing unit 1212 may include a rotation sensing module (not shown) to sense a rotation of the input device 1210. In this instance, when the motion sensing unit 1212 senses the rotation, the display device 1220 may determine whether an amount of the rotation is greater than a threshold value. When the amount of the rotation is greater than the threshold value, the display device 1220 may generate rotation information of the object and control the object based on the rotation information. In this instance, the rotation information may correspond to the rotation.

Also, according to exemplary embodiments, the input device 1210 may be in a spherical shape.

The input device 1210 according to further exemplary embodiments has been described with reference to FIG. 12. Here, the input device 1210 and the display device 1220 may be the same as or similar to exemplary embodiments of the input device 110 and the display device 120 described above with reference to FIG. 1, and thus further detailed descriptions will be omitted here.

The above-described exemplary embodiments may include program instructions which may be recorded in computer-readable media to implement various operations embodied on a hardware computing device. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa Although a few exemplary embodiments have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

What is claimed is:

1. An input device, comprising:
   a touch sensing unit to sense a touch on the input device and to generate a first sensing signal with respect to the sensed touch;
   a motion sensing unit to sense a motion of the input device and to generate a second sensing signal with respect to the sensed motion;
   an input signal generation unit to generate an input signal based on the first sensing signal and the second sensing signal; and
   a transmission unit to transmit the input signal to a display device,
   wherein the display device controls an object displayed on the display device based on the input signal, when the input signal is received,
   wherein the sensed touch of the input device is a touch between a user and the input device,
   wherein the touch sensing unit senses another touch between the input device and ground when the input device touches the ground, and
   wherein the input signal generation unit determines that the input device is not in contact with ground when the another touch is not sensed by the touch sensing unit.

2. The input device of claim 1, wherein the touch sensing unit comprises a pressure sensing module to sense a pressure, and the input signal generation unit comprises:
   a determination unit to determine whether the pressure is greater than a threshold value when the touch sensing unit senses the pressure; and
   a control information generation unit to generate control information of the object when the pressure is greater than the threshold value, the control information corresponding to the pressure,
   wherein the input signal includes the control information, and the display device extracts the control information from the input signal and controls the object based on the control information.

3. The input device of claim 2, wherein, when the object is a two-dimensional (2D) pointer, the control information generation unit generates the control information including a run command information about a second object that the 2D pointer indicates.

4. The input device of claim 2, wherein, when the object exists in a virtual three-dimensional (3D) space, the control information generation unit generates the control information to enable the object to drop according to a vertical coordinate axis.

5. The input device of claim 1, wherein:
   the touch sensing unit comprises a proximity touch sensing module to sense proximity touch,
   the input signal generation unit generates control information of the object when the touch sensing unit senses the proximity touch, the control information corresponding to the proximity touch, and
   the input signal comprises the control information, and the display device extracts the control information from the input signal and controls the object based on the control information.

6. The input device of claim 5, wherein the input signal generation unit generates the control information to enable the object to be activated.

7. The input device of claim 1, wherein the motion sensing unit comprises a movement sensing module to sense a movement, and the input signal generation unit comprises:
   a determination unit to determine whether an amount of the movement is greater than a threshold value when the motion sensing unit senses the movement; and
   a movement information generation unit to generate movement information of the object when the amount of the movement is greater than the threshold value, the movement information corresponding to the movement,
   wherein the input signal comprises the movement information, and the display device extracts the movement information from the input signal and controls the object based on the movement information.

8. The input device of claim 7, wherein the movement information includes movement direction information of the object, the movement direction information corresponding to a direction of the movement.

9. The input device of claim 7, wherein the motion sensing unit senses a movement in a 3D space through the movement sensing module, and the movement information generation unit generates 3D movement information of the object, the 3D movement information corresponding to the movement in the 3D space.

10. The input device of claim 7, wherein the motion sensing unit senses a change of a speed of the movement through the movement sensing module, and the movement information generation unit generates the movement information based on the change of the speed.

11. The input device of claim 7, wherein the motion sensing unit senses a change in the amount of the movement through the movement sensing module, and the movement information generation unit generates the movement information based on the change in the amount of the movement.

12. The input device of claim 1, wherein the motion sensing unit comprises a rotation sensing module to sense a rotation, and the input signal generation unit comprises:
   a determination unit to determine whether an amount of the rotation is greater than a threshold value when the motion sensing unit senses the rotation; and
   a rotation information generation unit to generate rotation information of the object when the amount of the rotation is greater than the threshold value, the rotation information corresponding to the rotation,
   wherein the input signal includes the rotation information, and the display device extracts the rotation information from the input signal and controls the object based on the rotation information.

13. The input device of claim 1, wherein the input device is in a spherical shape.

14. An input device, comprising:
   a touch sensing unit to sense a touch on the input device and to generate a first sensing signal with respect to the sensed touch;
   a motion sensing unit to sense a motion of the input device and to generate a second sensing signal with respect to the sensed motion; and
   a transmission unit to transmit the first sensing signal and the second sensing signal to a display device,
   wherein the display device controls an object displayed on the display device based on the first sensing signal and the second sensing signal, when the first sensing signal and the second sensing signal are received,
   wherein the sensed touch of the input device is a touch between a user and the input device,
   wherein the touch sensing unit senses another touch between the input device and ground when the input device touches the ground, and
   wherein the input device is not in contact with ground when the another touch is not sensed by the touch sensing unit.

15. The input device of claim 14, wherein the touch sensing unit comprises a pressure sensing module to sense a pressure, and the display device determines whether the pressure is greater than a threshold value when the touch sensing unit senses the pressure, generates control information of the object when the pressure is greater than the threshold value, and controls the object based on the control information, the control information corresponding to the pressure.

16. The input device of claim 14, wherein the touch sensing unit comprises a proximity touch sensing module to sense a proximity touch, and the display device generates control information of the object when the touch sensing unit senses the proximity touch, and controls the object based on the control information, the control information corresponding to the proximity touch.

17. The input device of claim 14, wherein the motion sensing unit comprises a movement sensing module to sense a movement, and the display device determines whether an amount of the movement is greater than a threshold value when the motion sensing unit senses the movement, generates movement information of the object when the amount of the movement is greater than the threshold value, and controls the object based on the movement information, the movement information corresponding to the movement.

18. The input device of claim 17, wherein the motion sensing unit senses a movement in a 3D space through the movement sensing module, and the display device generates 3D movement information of the object and controls the object based on the 3D movement information, the 3D movement information corresponding to the movement in the 3D space.

19. The input device of claim 17, wherein the motion sensing unit senses a change of a speed of the movement through the movement sensing module, and the display device generates the movement information based on the change of the speed and controls the object based on the movement information.

20. The input device of claim 17, wherein the motion sensing unit senses a change in the amount of the movement through the movement sensing module, and the display device generates the movement information based on the change in the amount of the movement and controls the object based on the movement information.

21. The input device of claim 14, wherein the motion sensing unit comprises a rotation sensing module to sense a rotation, and the display device determines whether an amount of the rotation is greater than a threshold value when the motion sensing unit senses the rotation, generates rotation information of the object when the amount of the rotation is greater than the threshold value, and controls the object based on the rotation information, the rotation information corresponding to the rotation.

22. The input device of claim 14, wherein the input device is in a spherical shape.

* * * * *